(12) United States Patent
Fukuoka et al.

(10) Patent No.: US 8,817,275 B2
(45) Date of Patent: Aug. 26, 2014

(54) IMAGE FORMING DEVICE, METHOD OF FORMING IMAGE, AND RECORDING MEDIUM STORING CONTROL PROGRAM FOR CONTROLLING IMAGE FORMING DEVICE

(75) Inventors: Kaoru Fukuoka, Toyokawa (JP); Yusaku Tanaka, Toyokawa (JP); Shoji Imaizumi, Shinshiro (JP); Yoichi Kurumasa, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 798 days.

(21) Appl. No.: 12/959,992

(22) Filed: Dec. 3, 2010

(65) Prior Publication Data

US 2011/0149320 A1 Jun. 23, 2011

(30) Foreign Application Priority Data

Dec. 18, 2009 (JP) ................................. 2009-288435

(51) Int. Cl.
*G06K 15/02* (2006.01)

(52) U.S. Cl.
USPC ....... 358/1.11; 358/3.26; 358/1.14; 358/3.27; 715/274

(58) Field of Classification Search
CPC ............ H02N 1/32144; H02N 1/3263; H02N 1/32651
USPC ................................. 358/1.11, 1.14
See application file for complete search history.

(56) References Cited

U.S. PATENT DOCUMENTS

| | | | |
|---|---|---|---|
| 2005/0105109 A1 | 5/2005 | Kikuchi | |
| 2005/0284324 A1* | 12/2005 | Fukui et al. | 101/484 |
| 2008/0055656 A1* | 3/2008 | Sato | 358/3.28 |

FOREIGN PATENT DOCUMENTS

| | | |
|---|---|---|
| JP | 11-10989 | 1/1999 |
| JP | 2004-228697 | 8/2004 |
| JP | 2005-129043 | 5/2005 |
| JP | 2005-176389 | 6/2005 |
| JP | 2006-7659 | 1/2006 |
| JP | 2006-343483 | 12/2006 |
| JP | 2008-61068 | 3/2008 |
| JP | 2009-212938 | 9/2009 |

OTHER PUBLICATIONS

Japanese Notice of Grounds of Rejection mailed Dec. 13, 2011, directed to Japanese Application No. 2009-288435; 5 pages.

* cited by examiner

*Primary Examiner* — King Poon
*Assistant Examiner* — Iriana Cruz
(74) *Attorney, Agent, or Firm* — Buchanan Ingersoll & Rooney PC

(57) ABSTRACT

An image forming device includes a scanner for scanning a document image, and a controller for controlling the image forming device. The controller determines whether or not a loss detection image for determining presence or absence of data loss has been superimposed on a first document image scanned by the scanner, and when it is determined that the loss detection image has been superimposed on the first document image, extracts the loss detection image from the first document image and determines presence or absence of data loss in the extracted loss detection image, and notifies a user of presence or absence of data loss based on a result of the determination of presence or absence of data loss in the extracted loss detection image.

18 Claims, 13 Drawing Sheets

FIG.9

| EMBEDDED IMAGE ID | 001 | 002 | ... | 00X |
|---|---|---|---|---|
| EMBEDDED AREA | (0,0)~(110,150) | (0,0)~(210,150) | ... | ... |
| EMBEDDED DATA | 1234567890 | 987654321 | ... | ... |
| USER NAME | AAA | BBB | ... | xxx |
| EMBEDDED NUMBER | 330 | 630 | ... | ... |

IMAGE FORMING DEVICE, METHOD OF FORMING IMAGE, AND RECORDING MEDIUM STORING CONTROL PROGRAM FOR CONTROLLING IMAGE FORMING DEVICE

This application is based on Japanese Patent Application No. 2009-288435 filed with the Japan Patent Office on Dec. 18, 2009, the entire content of which is hereby incorporated by reference.

BACKGROUND OF THE INVENTION

1. Field of the Invention

The present invention relates to an image forming device, and more particularly to an image forming device for detecting data loss in an image when reading and printing the image, a method of forming an image, and a recording medium storing a control program for controlling the image forming device.

2. Description of the Related Art

It is commonly practiced to read and print an image with a multifunction machine such as an MFP at home, at the office, and the like. During printing, various kinds of image processing for improving image quality are performed, and a preview of image data is displayed so that a user can check a printed result in advance. The user can check the contents, quality and the like of an image by looking at this displayed preview, to determine whether or not to perform printing.

When a preview of image data is displayed as described above, occurrence of data loss in the image data may not be noticed only with the display on a display unit. In particular, if image data with data loss is printed when accuracy of image data is demanded, an output result desired by a user may not be obtained.

Japanese Laid-Open Patent Publication No. 2005-129043 describes a method of detecting data loss by detecting occurrence of a bit error.

However, the method described in the above publication detects data loss based on whether or not there is structural loss in a file constituting image data, and cannot detect data loss when there is no structural loss in the file and there is loss in an image itself included in the image data. For example, this method cannot detect data loss that occurs due to a reading error when a document is read in a multifunction machine or the like. This method cannot detect data loss in an image itself, either, when a document with a sticky note attached on it is read by a scanner or the like.

SUMMARY OF THE INVENTION

The present invention was made to solve the problems as described above, and an object of the present invention is to provide an image forming device capable of readily identifying presence or absence of data loss in image data, a method of forming an image, and a recording medium storing a control program for controlling the image forming device.

An image forming device according to an aspect of the present invention includes a scanner for scanning a document image, and a controller for controlling the image forming device. The controller determines whether or not a loss detection image for determining presence or absence of data loss has been superimposed on a first document image obtained by the scanner, extracts the loss detection image from the first document image and determines whether or not there is data loss in the extracted loss detection image when it is determined that the loss detection image has been superimposed on the first document image, and notifies a user of presence or absence of data loss based on a result of the determination of whether or not there is data loss in the extracted loss detection image.

Preferably, the controller displays a preview of a portion of data loss in the loss detection image to the user.

Preferably, the controller superimposes the loss detection image on a first prescribed area of a second document image.

In particular, the controller superimposes the loss detection image on the entire surface or a partial area of the second document image.

In particular, the controller further superimposes determination data for identifying presence or absence of superimposition of the loss detection image as a determination image on a second prescribed area of the second document image when superimposing the loss detection image, and determines whether or not the loss detection image has been superimposed based on presence or absence of the determination data included in the first document image obtained by the scanner.

Preferably, the controller generates the loss detection image in accordance with input by the user.

In particular, the controller generates the loss detection image in which a character string input by the user is arranged according to a prescribed rule.

In particular, the controller determines whether or not there is data loss in the extracted loss detection image based on information input by the user which was used for generating the loss detection image.

In particular, the controller determines whether or not the character string input by the user is arranged according to the prescribed rule in the extracted loss detection image, and determines that there is data loss in the extracted loss detection image when it is determined that the character string input by the user is not arranged according to the prescribed rule.

A method of forming an image performed in an image forming device according to an aspect of the present invention includes the steps of scanning a document image, determining whether or not a loss detection image for determining presence or absence of data loss has been superimposed on an obtained first document image, extracting the loss detection image from the first document image when it is determined that the loss detection image has been superimposed on the first document image, determining whether or not there is data loss in the extracted loss detection image, and notifying a user of presence or absence of data loss based on a result of the determination of whether or not there is data loss in the extracted loss detection image.

Preferably, in the step of notifying a user of presence or absence of data loss, a preview of a portion of data loss in the loss detection image is displayed to the user.

Preferably, the method further includes the step of superimposing the loss detection image on a first prescribed area of a second document image.

In particular, in the superimposing step, the loss detection image is superimposed on the entire surface or a partial area of the second document image.

In particular, in the superimposing step, determination data for identifying presence or absence of superimposition of the loss detection image is further superimposed as a determination image on a second prescribed area of the second document image when the loss detection image is superimposed, and in the step of determining whether or not a loss detection image has been superimposed, it is determined whether or not the loss detection image has been superimposed based on presence or absence of the determination data included in the first document image obtained by a scanner.

Regarding a recording medium storing a control program to be executed by a computer of an image forming device according to an aspect of the present invention, the control program causes the computer of the image forming device to perform a process including the steps of scanning a document image, determining whether or not a loss detection image for determining presence or absence of data loss has been superimposed on an obtained first document image, extracting the loss detection image from the first document image when it is determined that the loss detection image has been superimposed on the first document image, determining whether or not there is data loss in the extracted loss detection image, and notifying a user of presence or absence of data loss based on a result of the determination of whether or not there is data loss.

Preferably, in the step of notifying a user of presence or absence of data loss, a preview of a portion of data loss in the loss detection image is displayed to the user.

Preferably, the control program further causes the computer of the image forming device to perform the step of superimposing the loss detection image on a first prescribed area of a second document image.

In particular, in the superimposing step, the loss detection image is superimposed on the entire surface or a partial area of the second document image.

In particular, in the superimposing step, determination data for identifying presence or absence of superimposition of the loss detection image is further superimposed as a determination image on a second prescribed area of the second document image when the loss detection image is superimposed, and in the step of determining whether or not a loss detection image has been superimposed, it is determined whether or not the loss detection image has been superimposed based on presence or absence of the determination data included in the first document image obtained by a scanner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 illustrates loss detection image information registered by the image superimposition unit.

DESCRIPTION OF THE PREFERRED EMBODIMENTS

An embodiment of the present invention will be described hereinafter with reference to the drawings. In the following description, the same components and constituent elements have the same characters allotted, and their names and functions are also the same.

(Overall Structure of MFP)

Figure 1:
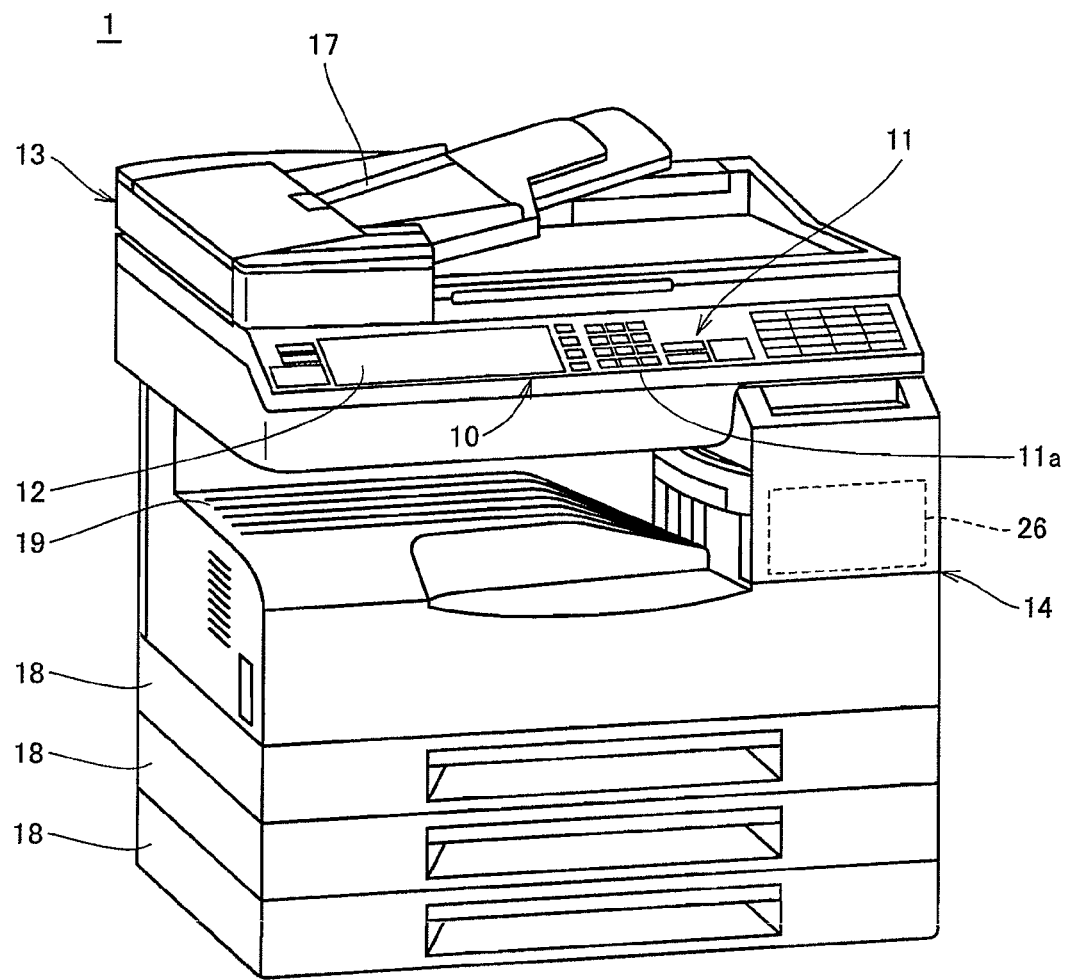
FIG. 1 is an external view of an MFP as an image forming device according to an embodiment of the present invention.

FIG. 1 is used to illustrate an external view of an MFP (Multi Function Peripheral) 1 as an image forming device according to an embodiment of the present invention.

Referring to FIG. 1, MFP 1 according to the embodiment of the present invention is a digital multifunction machine having a copy function, a scanner function and the like.

MFP 1 includes an operation panel 10. Operation panel 10 includes a plurality of keys 11a, an operation unit 11 for accepting input of various kinds of instructions, data such as characters and numbers resulting from operation of keys 11a by a user, and an operation display 12 made of a liquid crystal or the like for displaying an instruction menu to the user, information about an obtained image and the like.

MFP 1 also includes a scanner 13 for optically reading a document to obtain image data, and a printer 14 for printing an image on a recording sheet based on the image data.

MFP 1 further includes a feeder 17 on an upper surface of a body of MFP 1 for feeding a document to scanner 13, a sheet feed unit 18 at the bottom for supplying a recording sheet to printer 14, and a tray 19 in a central portion to which the recording sheet with an image printed by printer 14 is delivered.

In addition, MFP 1 includes therein a storage unit 26 and the like for storing required data such as a control program used in each unit for controlling the body, image data, and the like.

Figure 2:
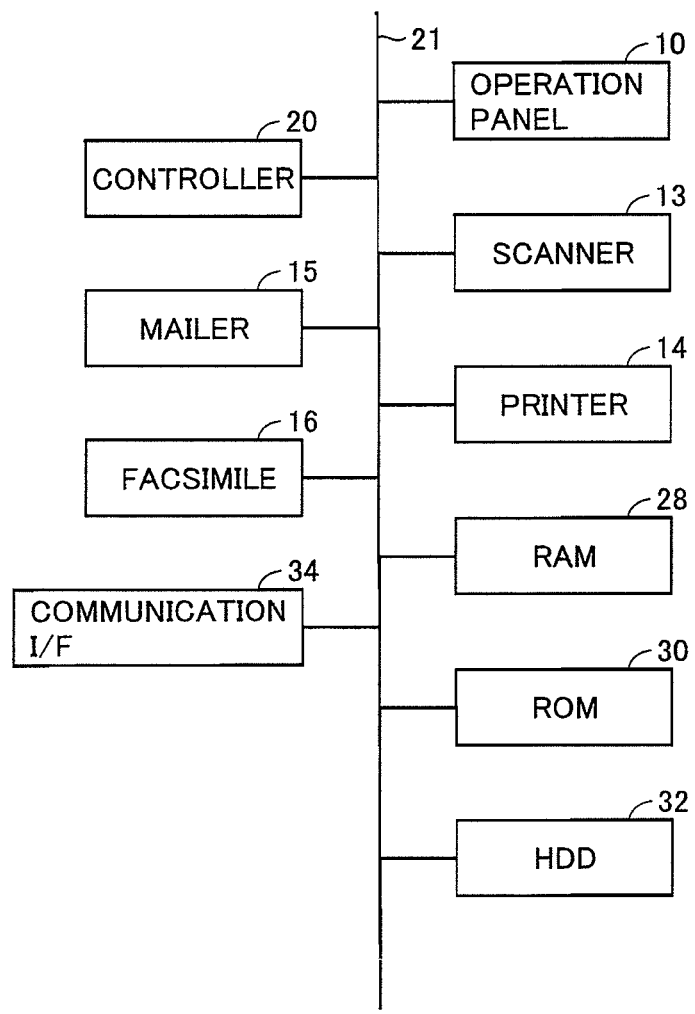
FIG. 2 illustrates a hardware configuration of the MFP according to the embodiment of the present invention.

FIG. 2 is used to illustrate a hardware configuration of MFP 1 according to the embodiment of the present invention.

Referring to FIG. 2, MFP 1 according to the embodiment of the present invention includes scanner 13 for converting a document such as a paper medium into image data (electronic data), printer 14 for performing print processing, a mailer 15 for transmitting and receiving an electronic mail (also referred to as an E-mail), a facsimile 16 for sending data through public lines, a communication interface (I/F) 34, operation panel 10 for executing an operation instruction such as input, a ROM (Read Only Memory) 30 storing a control program and the like, a RAM (Random Access Memory) 28 used as a work area and the like where a controller 20 and the like perform control processing, an HDD (Hard Disk Drive) 32 storing various kinds of information and the like registered with MFP 1, and controller 20 for controlling MFP 1 as a whole. Controller 20 is formed of a CPU (Central Processing Unit) and the like, for example. ROM 30, RAM 28, and HDD 32 form storage unit 26.

Each unit is connected to controller 20 via an internal bus 21, and controller 20 can supply and receive data to and from each unit.

Scanner 13 includes an optical sensor formed of a plurality of photoelectric conversion elements (light receiving elements). A document placed on feeder 17 is transported to scanner 13. The optical sensor photoelectrically reads image information such as a photograph, a character, and a picture from the document through a reading glass, and obtains image data. The obtained image data is converted to digital data, and after being subjected to various kinds of well-known image processing, temporarily stored in RAM 28, and sent to printer 14 and the like for use in printing an image and storing data.

Printer 14 prints an image on a recording sheet stored in sheet feed unit 18, based on the image data obtained by scanner 13 and the like.

Mailer 15 transmits and receives an electronic mail to and from a mail server and the like which are connected to mailer 15 via a not-shown network.

Facsimile 16 transmits the image data obtained by scanner 13 and the like to another facsimile device according to a prescribed protocol.

Communication I/F 34 is an interface for connecting each unit in MFP 1 to external equipment and the like connected to the not-shown network. Communication I/F 34 is connected to the network by wired or wireless connection, and supplies and receives data to and from another MFP, PC (Personal Computer) or the like. Examples of the network include a LAN (Local Area Network) and a WAN (Wide Area Network).

Operation display 12 of operation panel 10 includes an LCD (Liquid Crystal Display) and a touch panel. The LCD displays various kinds of modes, and the touch panel accepts various kinds of settings and the like in accordance with displayed contents and the like. Operation unit 11 is used for various kinds of input by the user. These elements function as an essential part of a user interface.

MFP 1 according to the embodiment of the present invention produces a superimposed document in which a loss detection image for determining presence or absence of data loss has been superimposed and printed on a document image. Then, MFP 1 determines presence or absence of data loss in the loss detection image when copying the superimposed document.

Figure 3:
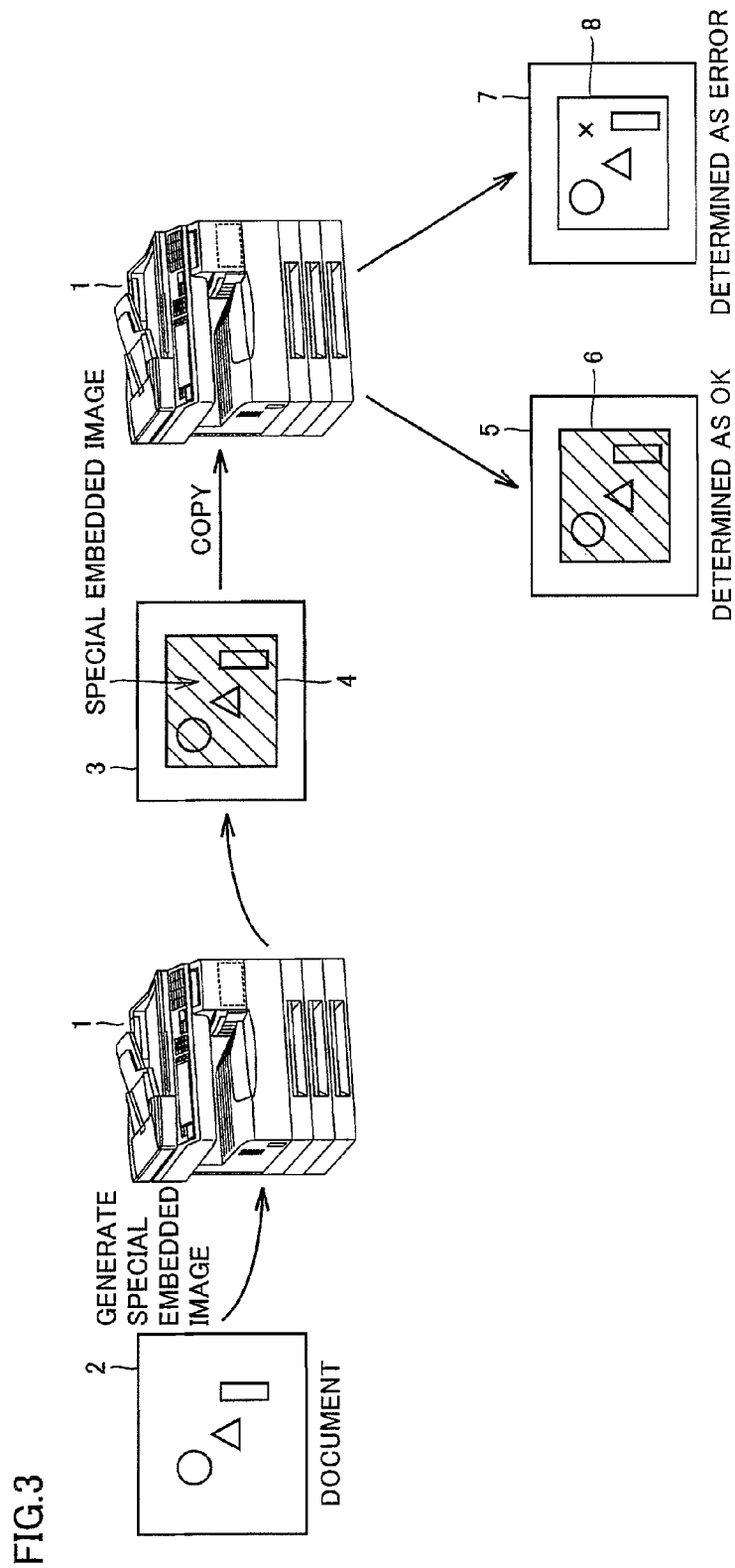
FIG. 3 is a conceptual diagram of a process flow for determining presence or absence of data loss in a document according to the embodiment of the present invention.

FIG. 3 is used to illustrate a conceptual diagram of a process flow for determining presence or absence of data loss in a document according to the embodiment of the present invention.

In the embodiment of the present invention, in order to determine presence or absence of data loss in an image (also referred to as a document image) of a document 2 serving as an original document (also referred to as an original document), MFP 1 first produces a document 3 (also referred to as a superimposed document) in which a loss detection image 4 for determining presence or absence of data loss has been superimposed on the document image of document 2. Then, MFP 1 determines whether or not data loss occurs when copying superimposed document 3. This determination of presence or absence of data loss is made based on whether or not data loss occurs in loss detection image 4, as will be described later.

A copied document 5 (also referred to as a copied document) obtained by copying superimposed document 3 shows a case where it was determined that data loss had not occurred in a loss detection image 6. On the other hand, a copied document 7 obtained by copying superimposed document 3 shows a case where it was determined that data loss had occurred in a loss detection image 8.

Figure 4:
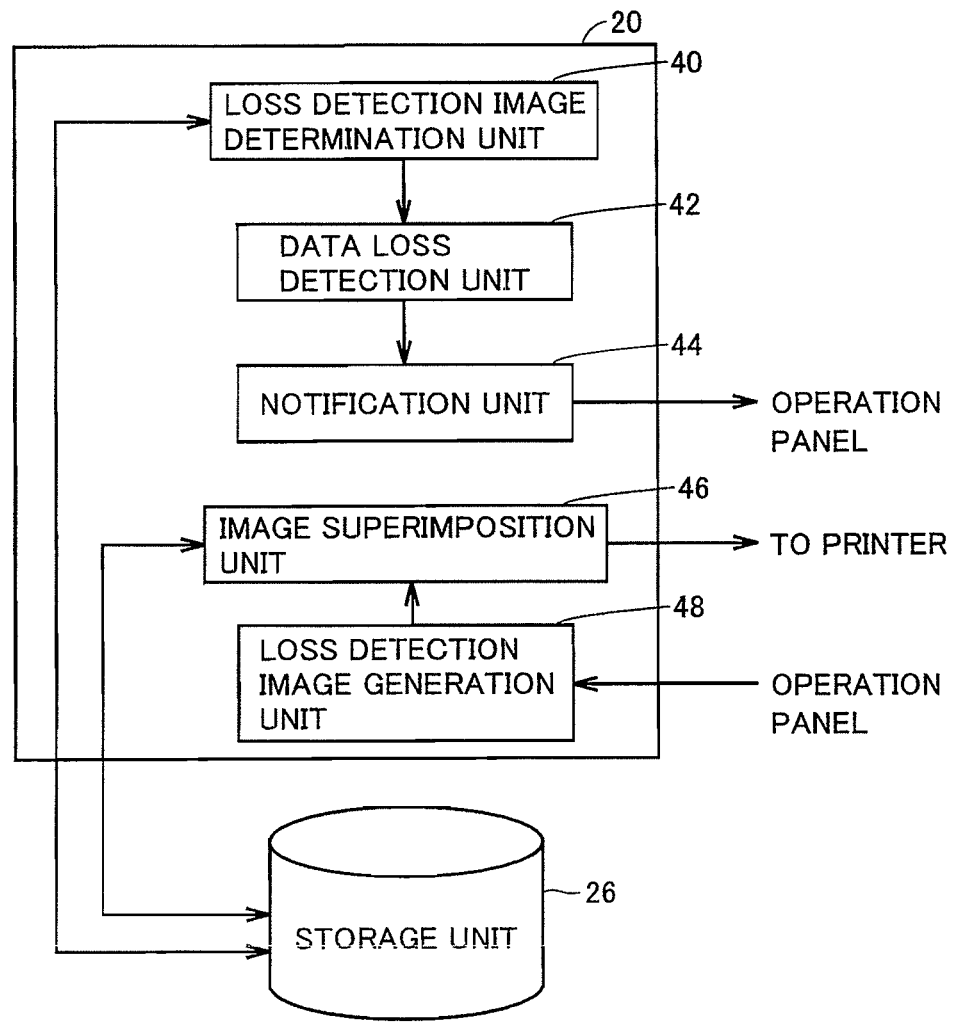
FIG. 4 is a functional block diagram, with each function being performed by a controller in the MFP according to the embodiment of the present invention.

FIG. 4 is used to illustrate blocks of functions performed by controller 20 in MFP 1 according to the embodiment of the present invention.

Referring to FIG. 4, controller 20 includes a loss detection image determination unit 40, a data loss detection unit 42, a notification unit 44, an image superimposition unit 46, and a loss detection image generation unit 48. The functions of the blocks of loss detection image determination unit 40, data loss detection unit 42, notification unit 44, image superimposition unit 46, and loss detection image generation unit 48 are implemented when controller 20 reads and executes a program stored in ROM 30, for example.

Loss detection image determination unit 40 determines whether or not the loss detection image has been superimposed on image data obtained by scanner 13.

If loss detection image determination unit 40 determines that the loss detection image has been superimposed on the image data, data loss detection unit 42 extracts the loss detection image from the image data, and determines whether or not there is data loss in the extracted loss detection image. More specifically, as will be described in detail later, data loss detection unit 42 extracts the loss detection image based on loss detection image information to be described later which is associated with determination data, and determines whether or not a character string (embedded data) input by the user and included in the loss detection image information is arranged in the extracted loss detection image according to a prescribed rule. If it is determined that the string is arranged according to the prescribed rule, data loss detection unit 42 determines that there is no data loss. On the other hand, if it is determined that the string is not arranged according to the prescribed rule, data loss detection unit 42 determines that there is data loss.

If data loss detection unit 42 determines that there is data loss, notification unit 44 displays a preview of a portion where the data loss has occurred (also referred to as a data loss portion) in the loss detection image on operation display 12 of operation panel 10 to the user.

Loss detection image generation unit 48 generates the loss detection image in accordance with operation (input) by the user via operation panel 10, and outputs the generated image to image superimposition unit 46. As will be described in detail later, loss detection image generation unit 48 generates a loss detection image in which a character string input by the user is arranged according to a prescribed rule, and outputs the generated image to image superimposition unit 46. Loss detection image generation unit 48 also generates loss detection image information for use in determining presence or absence of data loss, when generating the loss detection image.

Image superimposition unit 46 superimposes the loss detection image generated by loss detection image generation unit 48 on a designated area of the document image which is stored in RAM 28 forming storage unit 26. Specifically, image superimposition unit 46 superimposes the loss detection image on the designated entire surface or partial area of the document image. When superimposing the loss detection image on the designated area of the document image, image superimposition unit 46 further superimposes determination data for identifying presence or absence of superimposition of the loss detection image as a determination image on a prescribed area of the document image. Then, image superimposition unit 46 outputs the superimposed image to printer 14, which prints the superimposed image on a recording sheet. Further, as will be described later, image superimposition unit 46 registers loss detection image information, which was associated with the determination data for later use in determining presence or absence of data loss, with HDD 32.

First, a process of producing superimposed document 3 is described.

This process is performed by cooperation among loss detection image generation unit 48, image superimposition unit 46, storage unit 26, scanner 13, and printer 14.

Figure 5:
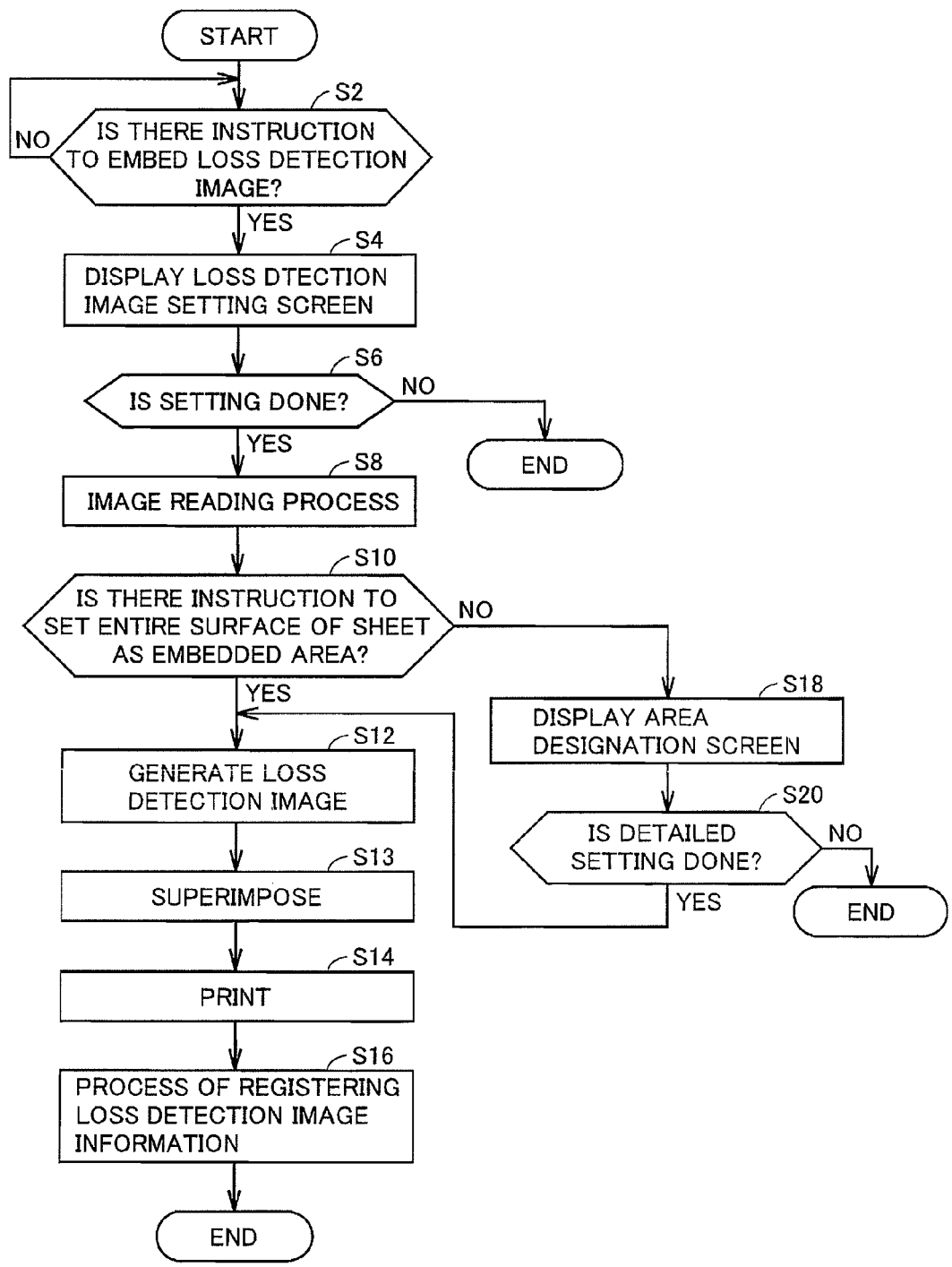
FIG. 5 illustrates a process performed by a loss detection image generation unit, an image superimposition unit and the like when a superimposed document is produced.

FIG. 5 is used to illustrate a process performed by loss detection image generation unit 48, image superimposition unit 46 and the like when superimposed document 3 is produced.

The process shown in a flowchart of FIG. 5 performed by loss detection image generation unit 48 and image superimposition unit 46 is implemented when controller 20 reads a program stored in ROM 30.

Referring to FIG. 5, first, loss detection image generation unit 48 determines whether or not there is an instruction to embed the loss detection image (step S2). The user provides the instruction to embed the loss detection image by pressing a key for indicating embedding of the loss detection image (embedding indication key) provided on operation panel 10.

If it is determined that there is the instruction to embed the loss detection image (YES at step S2), namely, if the embedding indication key is pressed by the user, loss detection image generation unit 48 displays a screen for setting a loss detection image (loss detection image setting screen) (step S4). Specifically, loss detection image generation unit 48 displays a loss detection image setting screen as shown in FIG. 6 on operation display 12.

Figure 6A:
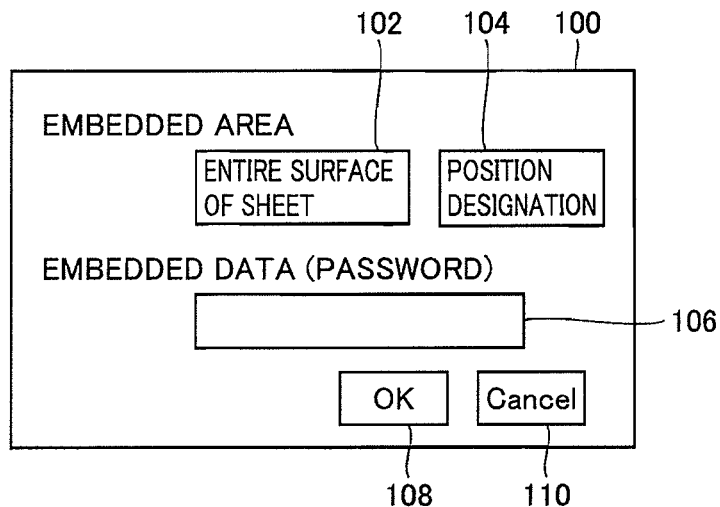
FIGS. 6A and 6B illustrate a method of setting a loss detection image according to the embodiment of the present invention.
Figure 6B:
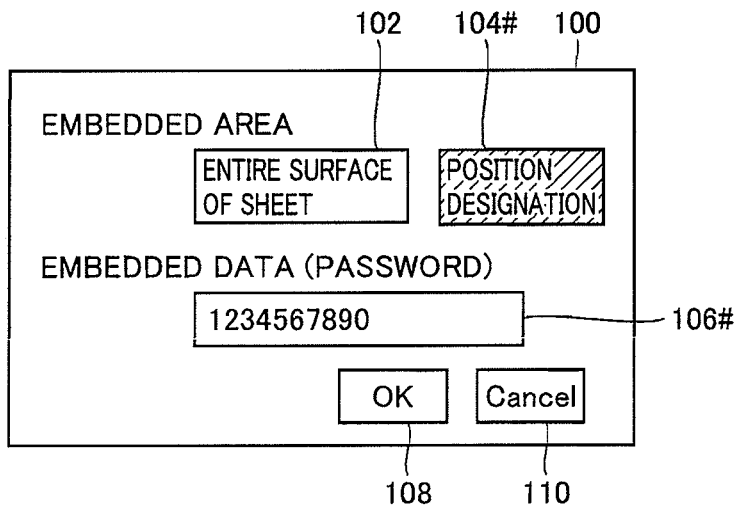

FIGS. 6A and 6B are used to illustrate a method of setting the loss detection image according to the embodiment of the present invention.

Here, a loss detection image setting screen 100 displayed on operation display 12 is shown.

Referring to FIG. 6A, loss detection image setting screen 100 displays buttons for selection between embedding of the loss detection image in the entire surface of the recording sheet and embedding of the loss detection image in a partial area of the recording sheet. An entire-surface-of-sheet button 102 is pressed for embedding the loss detection image in the entire surface of the recording sheet, and a position designation button 104 is pressed for embedding the loss detection image in a partial area of the recording sheet.

In addition, loss detection image setting screen 100 includes an input area 106 for inputting embedded data. The embedded data serves as reference data for generating the loss detection image, and will be described in detail later. The user can input a character string including at least one or more characters as the embedded data in input area 106 via operation keys 11a.

Upon completion of the input, the user can proceed to the next step by pressing an "OK" button 108. Alternatively, the user can cancel a series of operations on loss detection image setting screen 100 and return to an initial operation screen by pressing a "Cancel" button 110.

Referring to FIG. 6B, an example is shown where position designation button 104 is pressed for an embedded area, and a character string "1234567890" is input as embedded data (password).

Then, the user proceeds to the next step by pressing "OK" button 108. Although only numbers are input as the embedded data in the example of FIG. 6B, the embedded data is not particularly limited to numbers, and may include information such as alphabetical characters other than numbers.

Referring back to FIG. 5, next, loss detection image generation unit 48 determines whether or not the loss detection image was set (step S6). Specifically, loss detection image generation unit 48 determines that the loss detection image was set if "OK" button 108 is pressed on loss detection image setting screen 100 described above (YES at step S6).

On the other hand, loss detection image generation unit 48 determines that the loss detection image was not set if "Cancel" button 110 is pressed on loss detection image setting screen 100 (NO at step S6). If it is determined that the loss detection image was not set (NO at step S6), superimposed document 3 is not produced, and the process of this flowchart ends.

If it is determined that the loss detection image was set (YES at step S6), loss detection image generation unit 48 instructs scanner 13 to perform an image reading process (step S8). Specifically, as described above, a document placed on feeder 17 is transported to scanner 13, which obtains image data of the document (i.e., original document image) and stores the data in RAM 28.

Although the image reading process of step S8 is performed to obtain the image data after the loss detection image has been set in this example, this order of steps is not particularly restrictive. The image reading process may be performed first, followed by the process of step S2 and its subsequent steps. Further, although the image data of the document (original document image) is obtained by scanner 13 in this example, this is not particularly restrictive. For example, if MFP 1 is connected to a network such as a LAN and functions as a printer of a PC (Personal Computer) on the network, image data transmitted from the PC via the network may be used as the original document image in which the loss detection image is embedded, or image data stored in HDD 32 may be used.

Next, loss detection image generation unit 48 determines whether or not the entire surface of the sheet was set as an area where the loss detection image is embedded (step S10). Specifically, loss detection image generation unit 48 determines whether entire-surface-of-sheet button 102 was pressed or position designation button 104 was pressed on loss detection image setting screen 100.

If it is determined at step S10 that the entire surface of the sheet was set as an area where the loss detection image is embedded (YES at step S10), loss detection image generation unit 48 generates the loss detection image (step S12). A method of generating the loss detection image will be described later. When generating the loss detection image, loss detection image generation unit 48 also generates the loss detection image information, which is attribute information about that loss detection image.

Next, image superimposition unit 46 superimposes the loss detection image generated by loss detection image generation unit 48 and the original document image obtained by scanner 13 and stored in RAM 28 on each other (step S13). As will be described later, during this superimposition, image superimposition unit 46 also superimposes a determination image for identifying (determining) presence or absence of superimposition of the loss detection image. This determination image is used for retrieving the loss detection image information, which is attribute information about the loss detection image.

Then, image superimposition unit 46 outputs the superimposed image to printer 14, which prints the superimposed image on a recording sheet (step S14). This printed recording sheet serves as a superimposed document.

Next, image superimposition unit 46 performs a process of registering the loss detection image information, which is attribute information about the loss detection image generated by loss detection image generation unit 48 (step S16). Specifically, image superimposition unit 46 registers the loss detection image information with HDD 32, for example. This loss detection image information is used for determining presence or absence of data loss, which will be described later. The loss detection image information will be described in detail later.

After image superimposition unit 46 registers the loss detection image information with HDD 32, the process of this flowchart ends.

On the other hand, if it is determined at step S10 that the entire surface of the sheet was not set as an area where the loss detection image is embedded, namely, if it is determined that position designation button 104 was pressed on loss detection image setting screen 100 (NO at step S10), loss detection image generation unit 48 displays a screen for designating in detail an area where the loss detection image is embedded (area designation screen) (step S18).

Specifically, loss detection image generation unit 48 displays the area designation screen on operation display 12.

Figure 7:
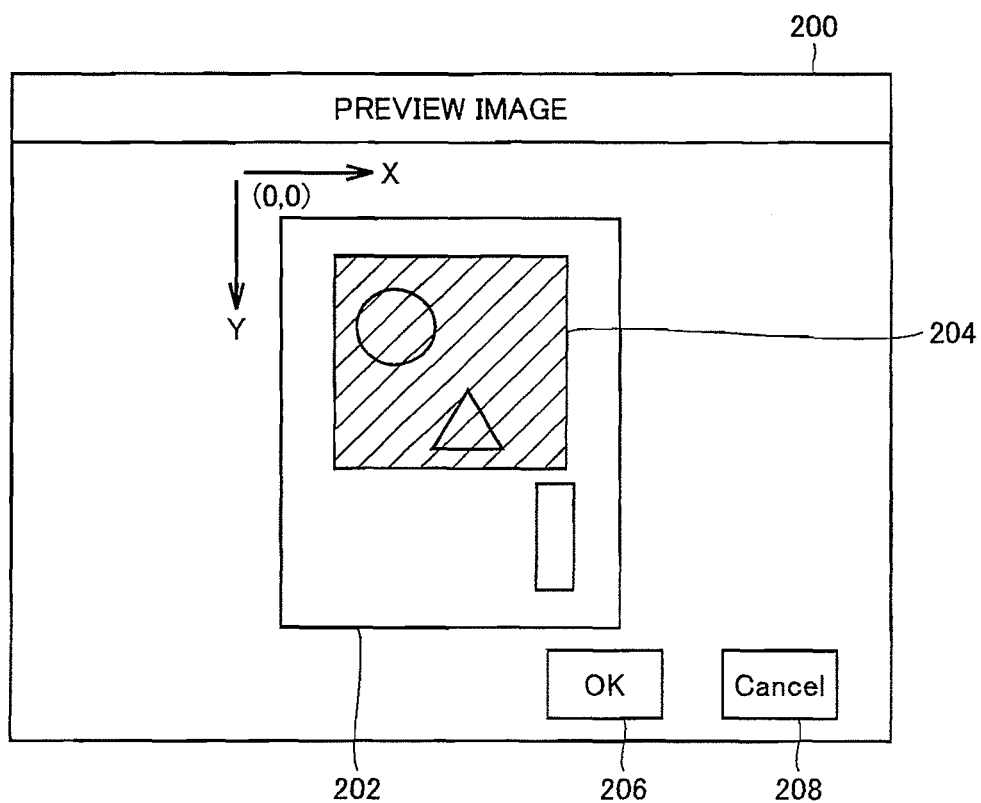
FIG. 7 illustrates an area designation screen according to the embodiment of the present invention.

FIG. 7 is used to illustrate an area designation screen 200 according to the embodiment of the present invention.

Referring to FIG. 7, area designation screen 200 displays a preview image 202 which shows the original document image and an area where the loss detection image is embedded. Area designation screen 200 shows the area where the loss detection image is embedded, which is superimposed on the original document image. In this example, the area where the loss detection image is embedded is indicated by hatched lines. The user can use the touch panel of operation display 12 to enlarge or reduce the area where the loss detection image is embedded by moving the area. For example, the user can move a finger while pressing an end portion of the area where the loss detection image is embedded with the finger, to enlarge or reduce the area where the loss detection image is embedded in accordance with a path taken by the finger.

Alternatively, the user can move a finger while pressing a portion near a center of the area where the loss detection image is embedded with the finger, to move the area where the loss detection image is embedded in accordance with a path taken by the finger.

After performing the operation of movement or the like of an area designation object, the user can decide the area where the loss detection image is embedded and proceed to the next step by pressing an "OK" button 206.

On the other hand, the user can cancel the operation on area designation screen 200 and return to the initial operation screen by pressing a "Cancel" button 208.

Referring back to FIG. 5, next, loss detection image generation unit 48 determines whether or not the area where the loss detection image is embedded was designated in detail (step S20). Specifically, loss detection image generation unit 48 determines that the area where the loss detection image is embedded was designated in detail if "OK" button 206 is pressed on area designation screen 200 described above (YES at step S20).

On the other hand, loss detection image generation unit 48 determines that the area where the loss detection image is embedded was not designated in detail if "Cancel" button 208 is pressed on area designation screen 200 (NO at step S20). If loss detection image generation unit 48 determines that the area where the loss detection image is embedded was not designated in detail (NO at step S20), superimposed document 3 is not produced, and the process of this flowchart ends.

If it is determined that the area where the loss detection image is embedded was designated in detail (YES at step S20), loss detection image generation unit 48 proceeds to step S12 and generates the loss detection image. A method of generating the loss detection image will be described later.

Then, in the same manner as described above, image superimposition unit 46 superimposes the loss detection image generated by loss detection image generation unit 48 and the original document image obtained by scanner 13 and stored in RAM 28 on each other (step S13). Then, image superimposition unit 46 outputs the superimposed image to printer 14, which prints the superimposed image on a recording sheet (step S14). This printed recording sheet serves as a superimposed document.

Next, image superimposition unit 46 performs the process of registering the loss detection image information, which is attribute information about the loss detection image generated by loss detection image generation unit 48 (step S16). After image superimposition unit 46 registers the loss detection image information with HDD 32, the process of this flowchart ends.

Figure 8:
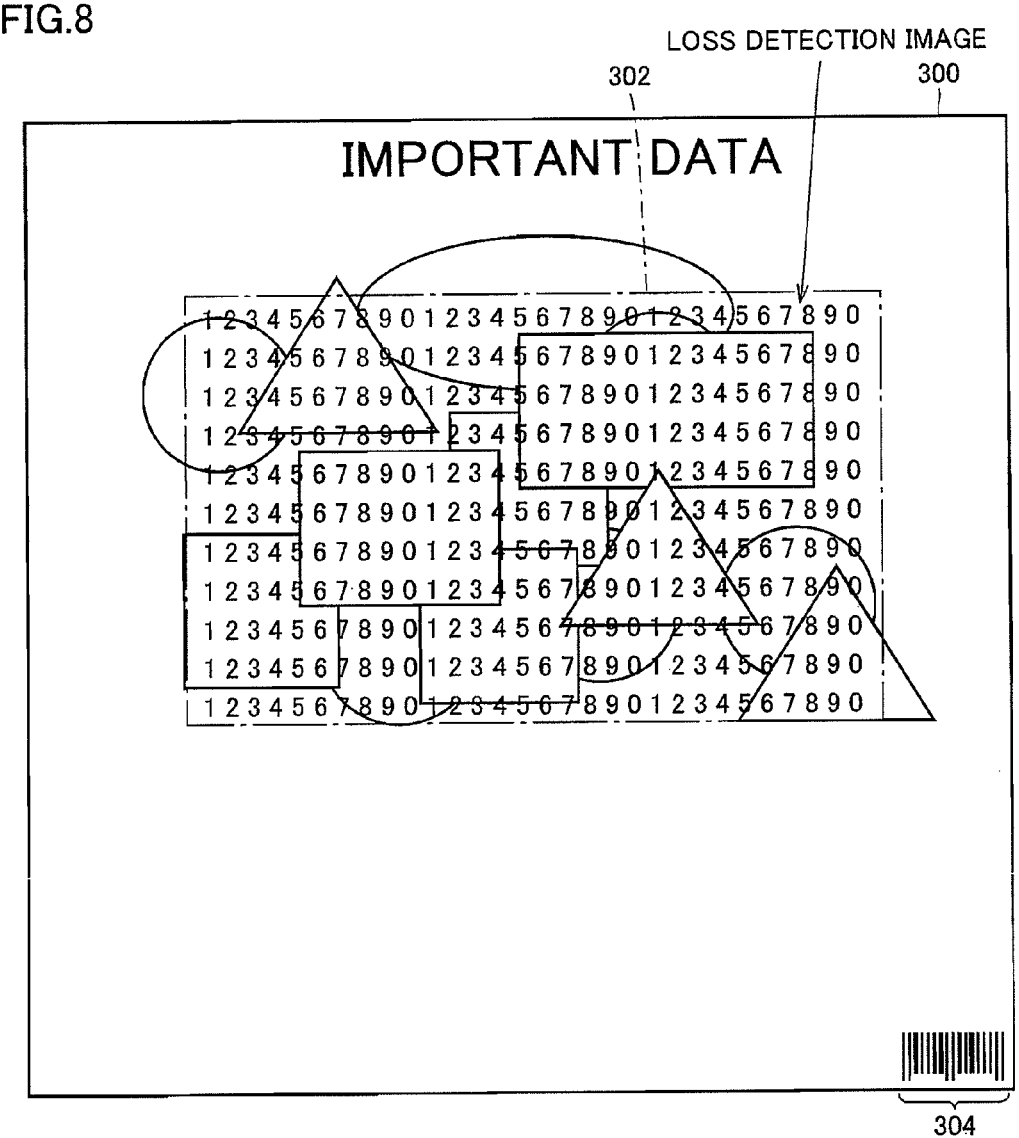
FIG. 8 illustrates a method of generating the loss detection image by the loss detection image generation unit.

FIG. 8 is used to illustrate a method of generating the loss detection image by loss detection image generation unit 48.

Referring to FIG. 8, an image (superimposed image) 300 is shown in which the original document image and the loss detection image have been superimposed on each other. As will be described later, the superimposed image includes a determination image 304 for identifying (determining) presence or absence of superimposition of the loss detection image. FIG. 8 shows a bar code as an exemplary determination image.

The loss detection image is generated based on the embedded data input by the user on loss detection image setting screen 100 described above.

Specifically, the character string designated as the embedded data is arranged according to a prescribed rule in the designated area where the loss detection image is embedded.

In an example described below, an area 110 mm long and 150 mm wide is designated as the area where the loss detection image is embedded, and a font size of the characters arranged as the loss detection image is 10 mm long and 5 mm wide.

In this case, 330 characters can be arranged in the area where the loss detection area is embedded. This number can be obtained by dividing the size of the area where the loss detection image is embedded by the font size of the characters.

The loss detection image is generated by repeatedly arranging the character string designated as the embedded data for 330 characters. In the example of FIG. 8, a loss detection image 302 is shown where "1234567890" is designated as the embedded data.

Characters of the character string designated as the embedded data are arranged one by one rightward from an upper left end of the area where the loss detection image is embedded. This process is repeated until a character reaches a lower right end of the area where the loss detection image is embedded. As a result, the loss detection image is generated in which the character string designated as the embedded data is continuously arranged in the designated area where the loss detection image is embedded.

If the entire surface of the sheet is designated as the area where the loss detection image is embedded, a loss detection image having the same size as the original document image is generated.

Although the loss detection image has been described as an image of characters of the character string arranged according to the prescribed rule in this example, this is not particularly restrictive. For example, the loss detection image may be a dot pattern or the like corresponding to the characters.

MFP 1 determines whether or not data loss has occurred based on the loss detection image when copying the superimposed document. Accordingly, by designating an area of great importance of the original document image as the area where the loss detection image is embedded, the user can determine whether or not data loss has occurred in the area of great importance when copying the superimposed document.

That is, when the user produces a superimposed document by superimposing the loss detection image on an area of great importance, i.e., an area where occurrence of data loss has to be prevented, of an original document image, and MFP 1 detects presence or absence of data loss in the superimposed loss detection image when copying the superimposed document, it is determined whether or not data loss has occurred in the area where the loss detection image has been embedded of the original document image.

Determination image 304 shown in FIG. 8 is used for determining whether or not a document to be copied is a superimposed document when the document is copied, and also for identifying a loss detection image embedded in the document to be copied. Thus, MFP 1 can determine whether or not a loss detection image has been superimposed on a read image by determining whether or not a document to be copied includes determination image 304. In addition, MFP 1 can identify the loss detection image from determination image 304, and determine the loss detection image embedded in the document to be copied.

FIG. 9 is used to illustrate the loss detection image information registered by image superimposition unit 46. The loss detection image information is generated when the loss detection image is generated at step S12 in the flowchart of FIG. 5.

Referring to FIG. 9, a plurality of pieces of loss detection image information are registered in this example. Each loss detection image information includes an embedded image ID, an embedded area, embedded data, a user name, and an embedded number.

The embedded image ID is identification information unique to the loss detection image generated at step S12 in the flowchart of FIG. 5.

Information about this image ID is recorded in the superimposed document as determination image 304 (bar code) shown in FIG. 8. That is, MFP 1 can identify a loss detection image embedded in the document based on determination image 304 (bar code). In this example, embedded image ID "001," ID "002," . . . ID "00X" are successively issued and registered.

The embedded area is information that indicates coordinates of an area where the loss detection image is embedded on a recording sheet.

Specifically, the area where the loss detection image is embedded is indicated by two coordinates of an upper left end and a lower right end of the embedded area. The unit of numerical values used is millimeters (mm), for example. In this example, an area having coordinates of (0, 0) to (110, 150) is registered as an embedded area corresponding to the embedded image ID "001." In this case, an area surrounded by (0, 0), (110, 0), (0, 150), and (110, 150) on the recording sheet is the embedded area. The same applies to embedded areas corresponding to the other embedded image IDs.

As described earlier, the embedded data serves as reference data for generating the loss detection image. In this example, "1234567890" is registered as the embedded data corresponding to the embedded image ID "001."

The user name is identification information about a user who performed operation of embedding the loss detection image. MFP 1 can identify a user who has logged on by a user authentication process performed during operation of MFP 1, with identification information about that user automatically set as the user name. As the user name corresponding to the embedded image ID "001" shown in FIG. 9, "AAA" is registered. The names of users who have logged on are registered by the user authentication process as the user names corresponding to the other embedded image IDs as well. The user authentication process is a known technique, and thus will not be described in detail.

The embedded number is the number of characters arranged in the embedded area. In this example, "330" is registered as the embedded number corresponding to the embedded image ID "001." The embedded numbers corresponding to the other embedded image IDs are also registered in the same manner.

By way of example, a case where a copy function of MFP 1 is utilized will be described below.

Specifically, a process of determining presence or absence of data loss during a copy process according to the embodiment of the present invention is described.

This process is performed by cooperation among loss detection image determination unit 40, data loss detection unit 42, notification unit 44, storage unit 26, scanner 13, and printer 14.

Figure 10:
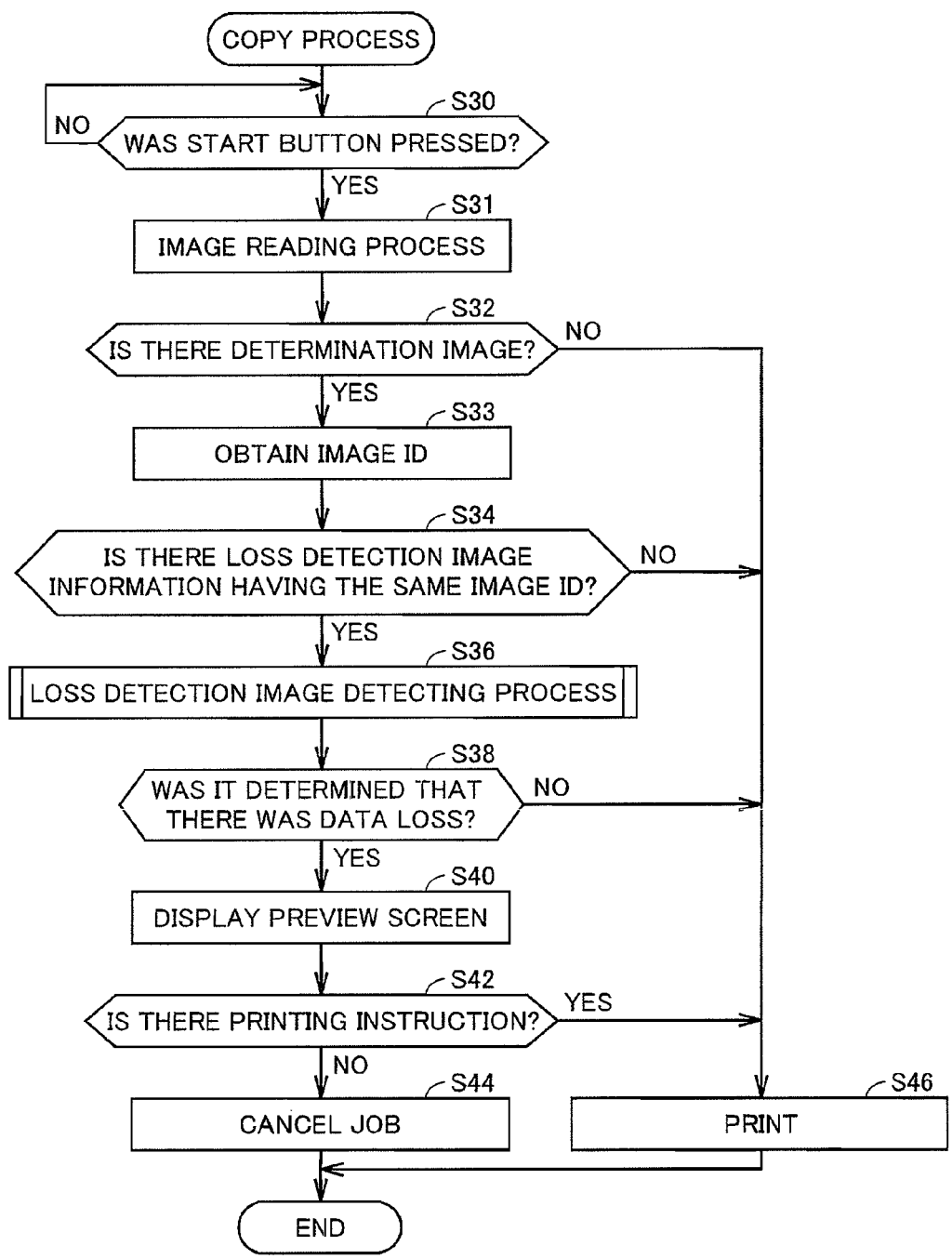
FIG. 10 illustrates a process of detecting data loss in a superimposed document, when a copy function of the MFP is utilized.

FIG. 10 is used to illustrate a process of detecting presence or absence of data loss in a superimposed document when a copy function of MFP 1 is utilized.

The process shown in a flowchart of FIG. 10 performed by loss detection image determination unit 40, data loss detection unit 42, and notification unit 44 is implemented when controller 20 reads a program stored in ROM 30. In the flowchart of FIG. 10, information about data loss is presented to the user based on the loss detection image, and a prescribed process is performed according to the instruction from the user.

Referring to FIG. 10, first, controller 20 determines whether or not a start button is pressed with a document placed on feeder 17 (step S30). Specifically, controller 20 determines whether or not there is an instruction to press a not-shown start button in operation panel 10.

If it is determined that the start button is pressed (YES at step S30), controller 20 performs an image reading process (step S31). Specifically, as described above, the superimposed document placed on feeder 17 is transported to scanner 13, which obtains image data of the superimposed document (also referred to as a superimposed document image) and stores the data in RAM 28.

Then, the process of determining presence or absence of data loss is performed as indicated below.

Loss detection image determination unit 40 determines whether or not the superimposed document image obtained by scanner 13 and stored in RAM 28 includes determination image 304 illustrated in FIG. 8 (step S32).

If it is determined that the superimposed document image stored in RAM 28 includes determination image 304 (YES at step S32), loss detection image determination unit 40 obtains an image ID for identifying the loss detection image based on determination image 304 (step S33).

Then, loss detection image determination unit 40 determines whether or not there is loss detection image information having the same image ID as that image ID (step S34). Specifically, loss detection image determination unit 40 retrieves loss detection image information, which has the same image ID as the image ID obtained at step S33, from storage unit 26.

If loss detection image determination unit 40 determines that there is loss detection image information having the same image ID as the obtained image ID (YES at step S34), data loss detection unit 42 performs a process of detecting the loss detection image (also referred to as a loss detection image detecting process) (step S36).

On the other hand, if loss detection image determination unit 40 determines that there is no loss detection image information having the same image ID (NO at step S34), a normal copy process (printing) is performed (step S46). That is, a copy job is transmitted to. printer 14 based on the image obtained at step S31, and printer 14 prints the superimposed document image on a recording sheet.

Next, the loss detection image detecting process performed by data loss detection unit 42 is described.

Figure 11:
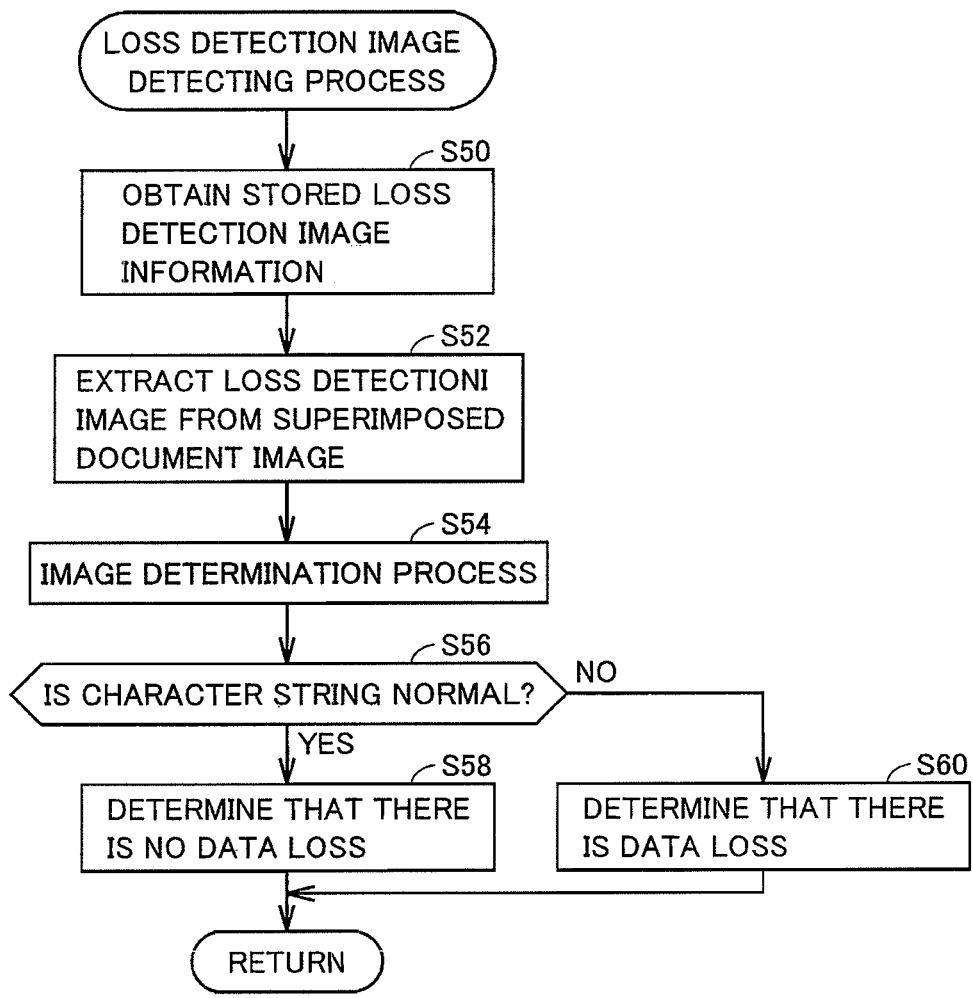
FIG. 11 illustrates a process performed by a data loss detection unit when a loss image is detected in a flowchart of FIG. 10.

FIG. 11 is used to illustrate a process performed by data loss detection unit 42 when detecting the loss detection image at step S36 in the flowchart of FIG. 10.

When controller 20 reads a program stored in ROM 30, data loss detection unit 42 implements the process shown in a flowchart of FIG. 11 based on that program.

In the flowchart of FIG. 11, the loss detection image is extracted from the superimposed document image, and it is determined whether or not there is data loss in the extracted loss detection image.

Referring to FIG. 11, first, data loss detection unit 42 obtains the loss detection image information retrieved at step S34 in the flowchart of FIG. 10 (step S50). Specifically, data loss detection unit 42 obtains the loss detection image information, which has the same image ID as the image ID shown in the determination image of the superimposed document image, out of the plurality of pieces of loss detection image information stored in HDD 32.

Next, data loss detection unit 42 extracts the loss detection image from the superimposed document image, based on information about the embedded area which is included in the obtained loss detection image information (step S52). Specifically, data loss detection unit 42 cuts (extracts) an image of an area designated by the embedded area from the superimposed document image. The image thus extracted is hereinafter referred to also as an extracted image.

Next, data loss detection unit 42 performs an image determination process (step S54). Specifically, data loss detection unit 42 determines whether or not loss has occurred in the extracted image, based on the loss detection image information obtained at step S50 and the extracted image extracted at step S52. More specifically, data loss detection unit 42 determines whether or not the character string designated as the embedded data is arranged according to the above prescribed rule for the number of characters designated as the embedded number.

A process of extracting a character from the extracted image can be performed by using a commonly used technique with an OCR (Optical Character Reader) or the like. The process is not particularly limited, and will not be described in detail.

Figure 12:
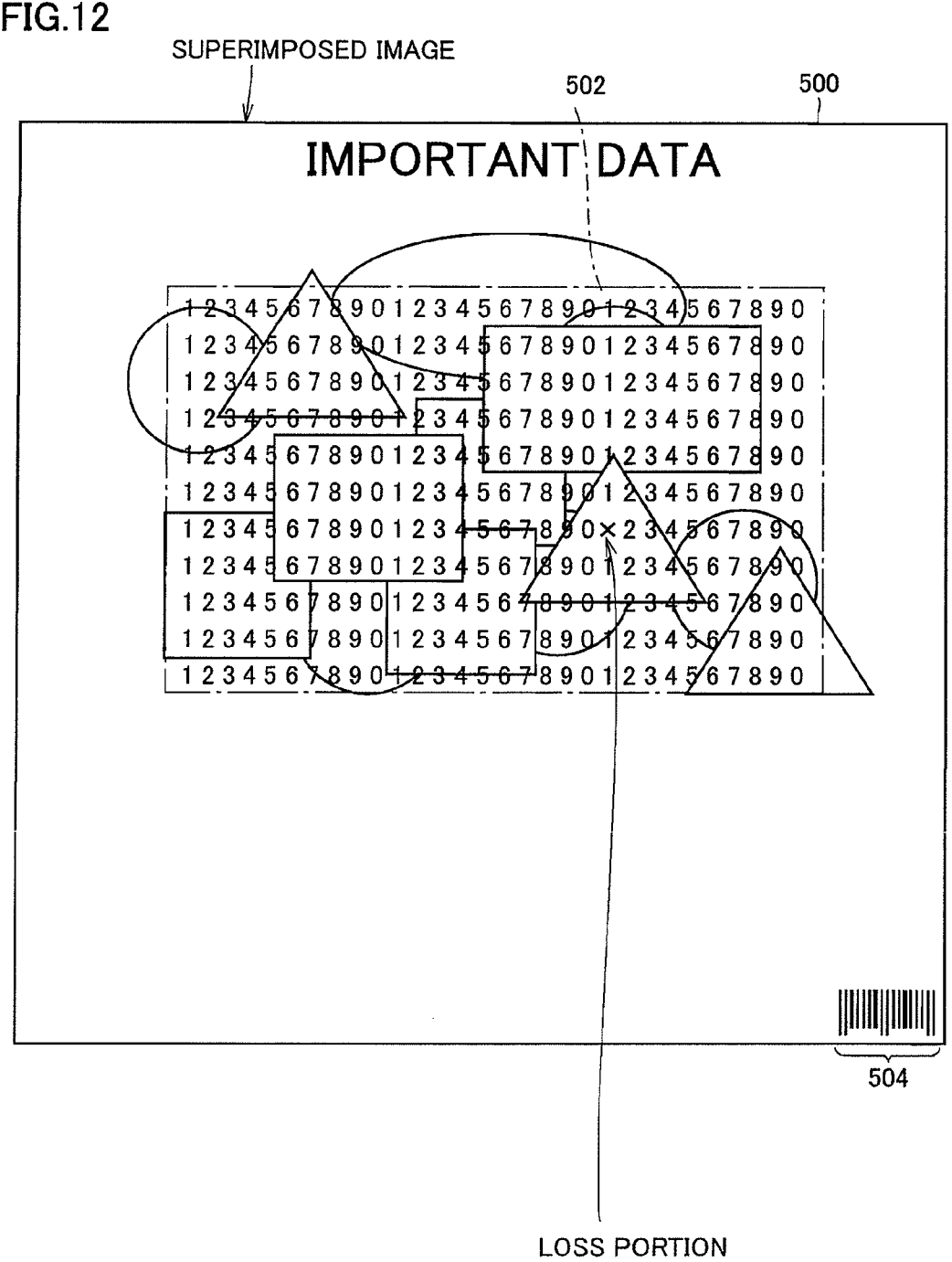
FIG. 12 illustrates a superimposed document image in which loss has occurred.

FIG. 12 is used to illustrate a superimposed document image where loss has occurred.

Referring to FIG. 12, a method of determining presence or absence of data loss by data loss detection unit 42 is described.

This example shows a superimposed document image 500 obtained at step S31 in the flowchart of FIG. 10, when a superimposed document is copied in which a loss detection image corresponding to the loss detection image information including the embedded image ID "001" shown in FIG. 9 is embedded.

This example shows that data loss has occurred in a loss detection image 502. In this example, a portion where the data loss has occurred is indicated by a sign "x".

Data loss detection unit 42 extracts loss detection image 502 based on the embedded area, and determines whether or not the character string designated as the embedded data is arranged according to the above prescribed rule in that loss detection image.

Data loss detection unit 42 extracts characters from the loss detection image, and determines whether or not the characters extracted from the loss detection image match characters corresponding to the embedded data "1234567890" one by one rightward from an upper left end. Upon reaching an upper right end, the determination proceeds to a left end in a second row, and is made again one by one rightward in the same manner as in the first low. This determination is repeated for "330" characters, which is the registered embedded number included in the loss detection image information. If the characters extracted from the loss detection image match the characters corresponding to the embedded data for all of the 330 characters, it is determined that there is no data loss.

Referring back to FIG. 11, at step S56, data loss detection unit 42 determines whether or not the character string is normal. Specifically, if the characters extracted from the loss detection image match the characters corresponding to the embedded data for all of the 330 characters registered as the embedded number (YES at step S56), data loss detection unit 42 determines that there is no data loss (step S58), and if there is a mismatch regarding any of the 330 characters (NO at step S56), data loss detection unit 42 determines that there is data loss (step S60).

Then, the process ends (returns). Namely, the process proceeds to step S38 in FIG. 10. In the example of FIG. 12, it is determined that there is data loss due to the occurrence of data loss in the portion indicated by the sign "x".

Referring back to FIG. 10, next, notification unit 44 determines whether or not it was determined that there was data loss (step S38).

If determination is made that it was determined that there was data loss (YES at step S38), notification unit 44 displays a preview screen on operation display 12 (step S40).

On the other hand, if determination is made that it was determined that there was no data loss (NO at step S38), notification unit 44 proceeds to step S46 where a copy process (printing) is performed.

Figure 13:
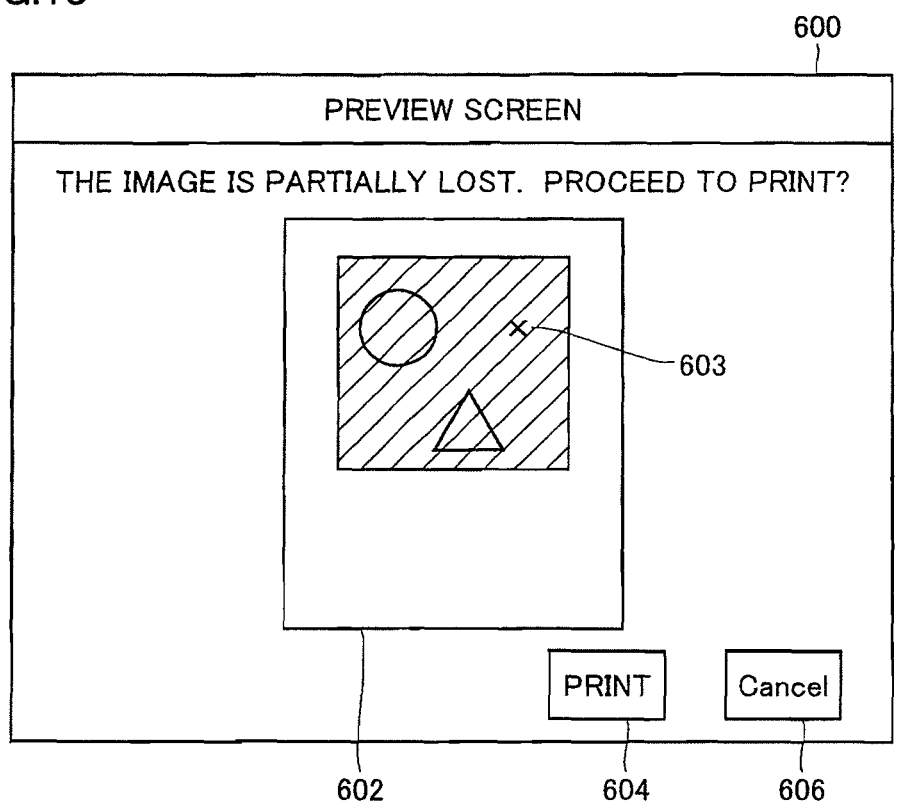
FIG. 13 illustrates a preview screen displayed by a notification unit in the flowchart of FIG. 10.

FIG. 13 is used to illustrate a preview screen 600 displayed by notification unit 44 at step S40 in the flowchart of FIG. 10.

Referring to FIG. 13, preview screen 600 is displayed on operation display 12 in this example.

Preview screen 600 displays a message of "The image is partially lost. Proceed to print?" and a preview image 602 based on the obtained superimposed document image data. In preview image 602, an area where the loss detection image has been embedded is indicated by hatched lines, with a portion where data loss has occurred (loss portion position 603) indicated by a sign "x".

The user can cause MFP 1 to copy the superimposed document image by pressing a "Print" button 604 provided on preview screen 600. Alternatively, the user can cancel printing of the superimposed document image by pressing a "Cancel" button 606.

Referring back to FIG. 10, at step S42, controller 20 determines whether or not there is a printing instruction. Specifically, controller 20 determines whether or not "Print" button 604 is pressed by the user on preview screen 600 shown in FIG. 13.

If there is a printing instruction (YES at step S42), namely, if "Print" button 604 is pressed, controller 20 performs a copy process (printing) based on the superimposed document image (step S46). That is, a copy job is transmitted to printer 14 based on the image obtained at step S31, and printer 14 prints the superimposed document image on the recording sheet.

On the other hand, if there is no printing instruction (NO at step S42), namely, if "Cancel" button 606 is pressed, controller 20 cancels a copy job for the superimposed document image read at step S31 (step S44). Then, the process ends.

That is, on preview screen 600, the user can see that there is data loss, and determine whether to continue a copy process (printing) for image data with the data loss, or to cancel the copy job because the image data includes the data loss and read the image data again.

In the embodiment of the present invention, a superimposed document in which a loss detection image for determining presence or absence of data loss has been superimposed and printed on a document image is generated, and presence or absence of data loss in the loss detection image is determined when the superimposed document is copied, so that it can be readily determined whether or not data loss has occurred in a copied image of the base document image. Moreover, since an area where the loss detection image is embedded can be designated, it is unnecessary to determine presence or absence of data loss across the area of the image data, thereby reducing a processing load on MFP 1.

The above example has been described with reference to a method of determining presence or absence of data loss by detecting a loss detection image included in a superimposed document image when a copy function of MFP 1 is utilized. The present invention is also applicable, for example, when performing a function of sending image data obtained by a scanner as attached file data by e-mail by using a scan function and a mail function associated with each other (also referred to simply as Scan-to-E-mail). Specifically, the present invention can be implemented by detecting a loss detection image included in a superimposed document image from image data obtained by a scanner, determining presence or absence of data loss, displaying a preview screen based on the determination before sending an e-mail, and determining whether to send the e-mail or to scan the image data again by a user. The present invention is not limited to Scan-to-Email, and is likewise applicable when performing a function regarding forwarding or sending of scanned image data via a network. In addition to the scan function, the present invention is also applicable when a facsimile function is utilized. In this case, in a manner similar to when the scan function is utilized, the present invention can be implemented by detecting a loss detection image included in a superimposed document image from obtained image data, determining presence or absence of data loss, displaying a preview screen based on the determination before facsimile transmission, and determining whether to proceed with facsimile transmission or to perform reading with the facsimile function again by the user.

In the above description, the number of characters arranged in the loss detection image (the embedded number) is registered as the loss detection image information which is attribute information. Alternatively, prescribed data (mark) indicating the end may be embedded at the end of the arranged characters, for example. In this case, it is unnecessary to store the embedded number as the loss detection image information, and it may be determined that there is no data loss if no mismatch occurs until the prescribed data (mark), and that there is data loss if a mismatch occurs until the prescribed data (mark).

A method of causing a computer to perform control as described in the above flow or a program to be executed by a computer for implementing this method may be provided. Such a program may be recorded in a computer-readable recording medium such as a flexible disc, a CD-ROM (Compact Disk-Read Only Memory), a ROM (Read Only Memory), a RAM (Random Access Memory), and a memory card, to be attached to a computer, and may be provided as a program product. Alternatively, a program may be provided as recorded in a recording medium such as a hard disk contained in a computer. Alternatively, a program may be provided by downloading via a network.

A program may invoke a necessary module from among program modules provided as a part of the operation system (OS) of the computer at prescribed timing in prescribed sequences and cause the module to perform processing. Here, the program itself does not include the module above but processing is performed in cooperation with the OS. Such a program not including a module may also be encompassed in the program according to the present invention.

In addition, the program according to the present invention may be provided as incorporated as a part of another program. In this case as well, the program itself does not include the module included in another program but processing is performed in cooperation with another program. Such a program incorporated in another program may also be encompassed in the program according to the present invention.

A provided program product is installed in a program storage portion such as a hard disk and executed. It is noted that the program product includes a program itself and a recording medium recording a program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming device comprising:
   a scanner for scanning a document and obtaining a document image data;
   a memory; and
   a controller for controlling said image forming device,
   said controller including:
   a first determining unit for determining whether or not said document image data obtained by scanning is a document image data which has been formed from an original document image data by superimposing a loss detection image for determining presence or absence of data loss,
   said memory storing an information of a loss detection image corresponding to the contents of said loss detection image,
   said controller further including:
   a second determining unit for determining whether or not there is data loss in an extracted loss detection image based on a loss detection image extracted from said document image data and said information of said loss detection image stored in said memory when it is determined that the loss detection image has been superimposed on said original document image data,
   said image forming device further comprising:
   a notifying unit for notifying a user of presence of data loss on said obtained document image data based on a result of the determination of whether or not there is data loss in the extracted loss detection image.

2. The image forming device according to claim 1, wherein said notifying unit displays a preview of a portion of data loss in said loss detection image to the user.

3. The image forming device according to claim 1, wherein said controller further includes a superimposing unit for superimposing said loss detection image on a prescribed area of said original document image data and outputting the same as a second document image data.

4. The image forming device according to claim 3, wherein said superimposing unit superimposes said loss detection image on the entire surface or a partial area of said original document image data.

5. The image forming device according to claim 1, wherein said controller further includes a generating unit for generating said loss detection image in accordance with input by the user,
said memory stores an information of a loss detection image corresponding to the contents of said generated loss detection image.

6. The image forming device according to claim 5, wherein said generating unit generates said loss detection image in which a character string input by the user is arranged according to a prescribed rule.

7. The image forming device according to claim 6, wherein said first determining unit determines whether or not the character string input by the user is arranged according to the prescribed rule in the extracted loss detection image, and determines that there is data loss in the extracted loss detection image when it is determined that the character string input by the user is not arranged according to the prescribed rule.

8. A method of forming an image preformed in an image forming device, comprising the steps of: obtaining a document image data by scanning a document; controlling said image forming device using a controller that comprises a first determination unit and a second determining unit; determining, using a said first determining unit, whether or not document image data obtained by scanning is a document image data which has been formed from an original document image data by superimposing a loss detection image for determining presence or absence of data loss; extracting the loss detection image from said document image data when is determines that the loss detection image has been superimposed on said original document image data; storing, in memory, an information of a loss detection image corresponding to contents of said loss detection image, determining, using said second determination unit, whether or not there is data loss in the extracted loss detection image based on said loss detection image extracted from said document image data and the information of said loss detection image stored in the memory; and notifying a user of presence of data loss on said obtained document image data based on a result of the determination of whether or not there is data loss.

9. The method of forming an image according to claim 8, wherein
in said step of notifying a user of presence or absence of data loss, a preview of a portion of data loss in said loss detection image is displayed to the user.

10. The method of forming an image according to claim 8, further comprising the step of superimposing said loss detection image on a prescribed area of said original document image data and outputting the same as a second document image data.

11. The method of forming an image according to claim 10, wherein
in said superimposing step, said loss detection image is superimposed on the entire surface or a partial area of said original document image data.

12. A non-transitory recording medium storing a control program to be executed by a computer of an image forming device, said non-transitory control program causing the computer of said image forming device to perform a process comprising the steps of: obtaining a document image data by scanning a document; controlling said image forming device using a controller that comprises a first determining unit and a second determining unit; determining, using said first determining unit, whether or not document image data obtained by scanning is a document image data which has been formed from an original document image data by superimposing a loss detection image for determining presence or absence of data loss; extracting the loss detection image from said document image data when it is determined that the loss detection image has been superimposed on said original document image data; storing, in a memory, an information of a loss detection image corresponding to contents of said loss detection image; determining, using said second determination unit, whether or not there is data loss in the extracted loss detection image based on said loss detection image extracted from said document image data and the information of said loss detection image stored in the memory; and notifying a user of presence of data loss on said obtained document image data based on a result of the determination of whether or not there is data loss.

13. The recording medium according to claim 12, wherein
in said step of notifying a user of presence or absence of data loss, a preview of a portion of data loss in said loss detection image is displayed to the user.

14. The recording medium according to claim 12, wherein
said non-transitory control program further causes the computer of said image forming device to perform a process comprising the step of superimposing said loss detection image on a prescribed area of said original document image data and outputting the same as a second document image data.

15. The recording medium according to claim 14, wherein
in said superimposing step, said loss detection image is superimposed on the entire surface or a partial area of said original document image data.

16. The image forming device according to claim 4, wherein
said superimposing unit further superimposes determination data for identifying presence or absence of superimposition of said loss detection image as a determination image on a prescribed area of said output second document image data when superimposing said loss detection image,
said first determining unit determines whether or not said loss detection image has been superimposed based on presence or absence of said determination data included in said document image data obtained by said scanner.

17. The method of forming an image according to claim 11, wherein
in said superimposing step, determination data for identifying presence or absence of superimposition of said loss detection image is further superimposed as a determination image on a prescribed area of said output second document image data when said loss detection image is superimposed; and
in said step of determining whether or not a loss detection image has been superimposed, it is determined whether or not said loss detection image has been superimposed based on presence or absence of said determination data included in said document image data obtained by a scanner.

18. The recording medium according to claim 15, wherein
in said superimposing step, determination data for identifying presence or absence of superimposition of said loss detection image is further superimposed as a determination image on a prescribed area of said output second document image data when said loss detection image is superimposed; and in said step of determining whether or not a loss detection image has been superimposed, it is determined whether or not said loss detection image has been superimposed based on presence or absence of said determination data included in said document image data obtained by a scanner.

\* \* \* \* \*